No. 709,589. Patented Sept. 23, 1902.
A. T. UPTON.
FOLDING HARROW.
(Application filed Apr. 16, 1902.)
(No Model.)
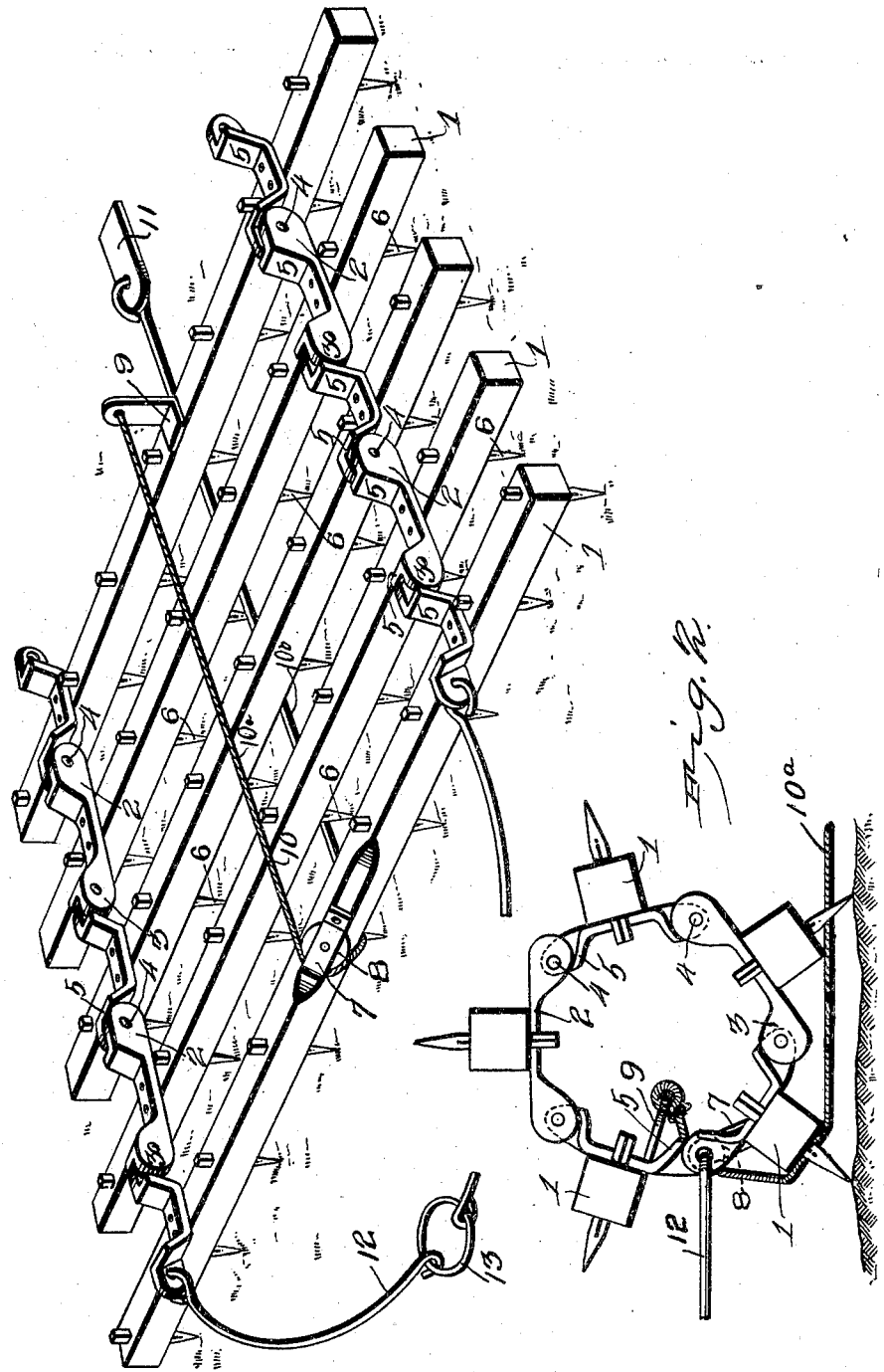

UNITED STATES PATENT OFFICE.

ALVA THOMAS UPTON, OF MOUNT VERNON, ILLINOIS, ASSIGNOR OF ONE-HALF TO CYRUS C. JOHNSON, OF MOUNT VERNON, ILLINOIS.

FOLDING HARROW.

SPECIFICATION forming part of Letters Patent No. 709,589, dated September 23, 1902.

Application filed April 16, 1902. Serial No. 103,196. (No model.)

*To all whom it may concern:*

Be it known that I, ALVA THOMAS UPTON, a citizen of the United States, residing at Mount Vernon, in the county of Jefferson and State of Illinois, have invented a new and useful Folding Harrow, of which the following is a specification.

My invention is an improved flexible folding harrow; and it consists in the peculiar construction and combination of devices hereinafter fully set forth and claimed.

The object of my invention is to effect improvements in the construction of a harrow whereby the same is rendered flexible, so that it may adapt itself to inequalities in the surface of the soil and so that it may be readily folded to clear its teeth of trash when the same has accumulated thereon.

In the accompanying drawings, Figure 1 is a perspective view of a folding flexible harrow embodying my improvements. Fig. 2 is a side elevation of the same, showing the harrow folded in order to clear its teeth of adhering earth.

The bars 1 of the harrow are parallel with one another and are connected together by hinge-links 2. The same are provided at their ends with upstanding ears 3, the respective ears of the hinge-links overlapping each other and being connected together pivotally by pintles 4, and the said ears are provided with laterally-extending stop-flanges 5. The length of the hinge-links is such as to dispose the harrow-bars 1 at the required distance apart, and the height of the lateral stop-flanges 5 is such as to cause the same, by engagement with one another, to support the harrow-bars when the harrow is folded, as shown in Fig. 2. The harrow-bars carry the harrow-teeth 6, which may be of the usual or any suitable construction. To the front bar of the harrow, at the center thereof, is secured a bracket 7, which carries a direction-sheave 8. A bracket 9 is detachably secured on the center of the rear harrow-bar. A rope, chain, or other suitable flexible element 10 is attached to the bracket 9, passes forward over and in engagement with the sheave 8, and thence extends rearwardly under the central portion of the harrow and is provided at its rear end with a pedal-drag 11, which is drawn in rear of the harrow. In the embodiment of my invention shown in Fig. 1 the flexible connecting element 10 between the bracket 9 and the pedal-drag comprises a rope $10^a$, which runs from the said bracket over the sheave 8, and a rod $10^b$, which connects said rope to the pedal-drag; but this may be varied or departed from without the exercise of invention, and I do not limit myself in this particular.

Draft-rods 12 are connected together at their inner ends, as by a link-ring 13, to which a singletree or doubletree may be attached, and the outer ends of said draft-rods are hooked to the forwardly-extending ears of the hinge-links on the front bar of the harrow. By reversing the draft-rods, the bracket 7, and the bracket 9 either end of the harrow may be caused to become the front end thereof, so that when the harrow-teeth have become dulled on one side the harrow may be reversed to bring the sharpened reversed sides of the harrow-teeth into operation.

The hinge-links flexibly connect the harrow-bars together, so that the same are adapted to rise and fall independently of each other to accommodate themselves to inequalities in the surface of the soil and enable the harrow to effectually pulverize the soil between the ridges as well as on the ridges. When the harrow-teeth become clogged with trash, the driver steps on the pedal-drag 11, and as the harrow continues its forward movement the rope 10 draws forwardly on the rear harrow-bar, thereby raising the latter and each of the other harrow-bars successively to fold the harrow, as shown in Fig. 2, and thereby effectually clear the teeth of the trash.

When the harrow is to be transported or stored, the same can be rolled reversely into cylindrical form to dispose the points of the teeth inwardly, as will be understood, thus enabling the harrow to be readily handled and more compactly disposed.

Having thus described my invention, I claim—

1. In combination with a harrow having transversely-disposed bars and flexible connections between them, a flexible element attached to the rear bar of the harrow, passed forwardly over the harrow and thence downwardly and rearwardly under the same, for the purpose set forth, substantially as described.

2. In combination with a harrow having transversely-disposed bars and flexible connections between them, a flexible element attached to the rear bar of the harrow, passed forwardly over the harrow and thence downwardly and rearwardly under the same, and a pedal-drag attached to said flexible element, for the purpose set forth, substantially as described.

3. A flexible harrow having cross-bars and hinge-links flexibly connecting them together, said hinge-links having stops adapted to come in contact with each other when the harrow is folded, substantially as described.

4. A flexible harrow having cross-bars and hinge-links flexibly connecting them together, said hinge-links having mutually-engaging upstanding ears at their ends pivotally connected together and transversely-disposed stops extended laterally from said ears, said stops being adapted to come in contact with each other when the harrow is folded, substantially as described.

5. A flexible harrow having cross-bars and hinge-links flexibly connecting them together, said hinge-links having mutually-engaging stops on one side adapted to come in contact with each other when the harrow is folded in one direction with the points of its teeth outward, and adapted to turn in the reverse direction to dispose the harrow compactly with the points of its teeth inward, substantially as described.

6. A harrow having transversely-disposed bars, flexible connections between them, a flexible element attached to the rear bar of the harrow, passed forwardly over the harrow and thence downwardly and rearwardly under the same, whereby the harrow may be folded, and stops, coacting with the flexible connections, to support the bars when the harrow is folded, substantially as described.

In testimony that I claim the foregoing as my own I have hereto affixed my signature in the presence of two witnesses.

ALVA THOMAS UPTON.

Witnesses:
C. W. HARRISS,
A. D. WEBB.